Sept. 13, 1932.   C. H. SAUVAN   1,876,764
INTERNAL COMBUSTION ENGINE
Filed Nov. 4, 1930   2 Sheets-Sheet 1
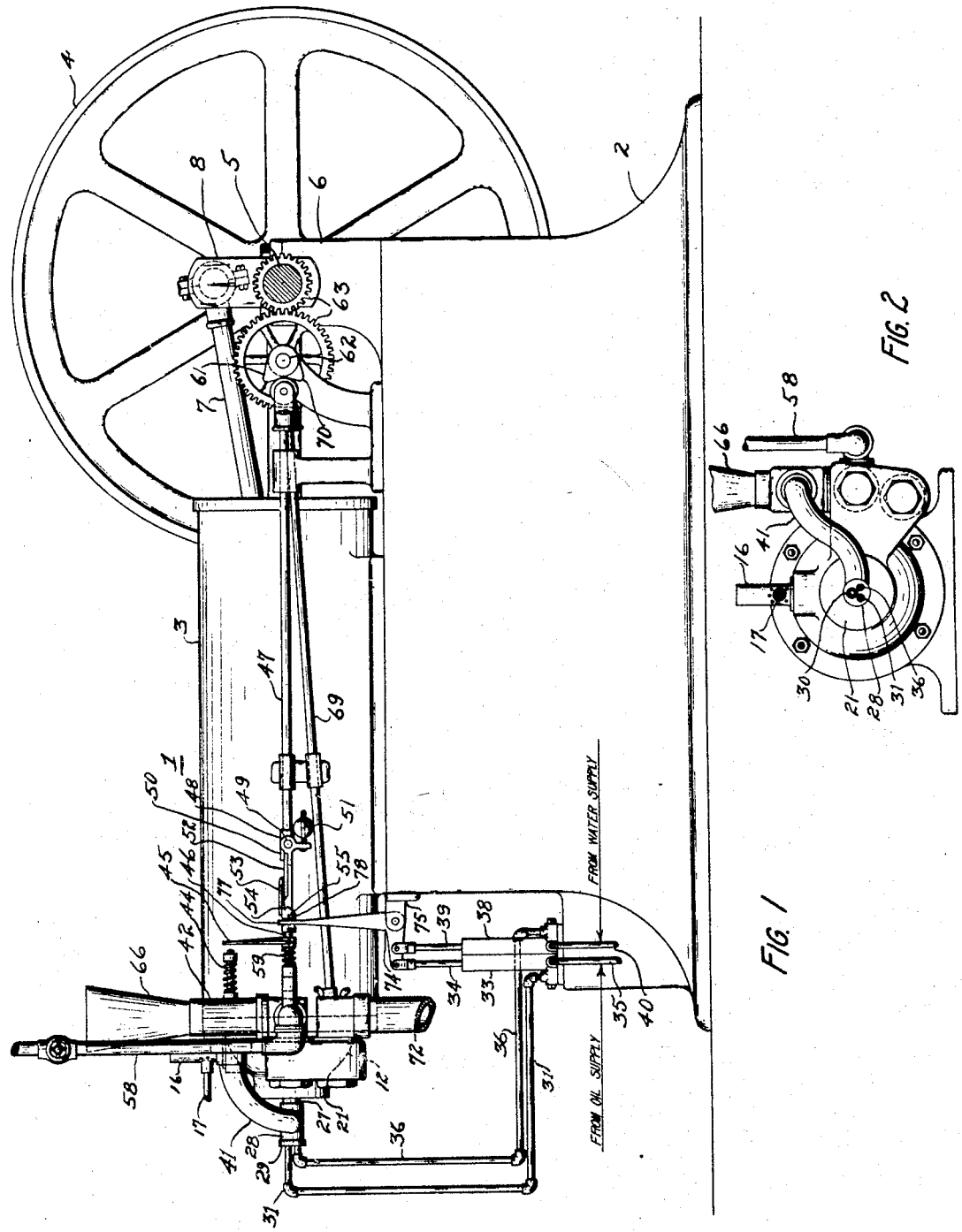
INVENTOR.
Charles H. Sauvan,
BY George D. Richards
ATTORNEY.

Sept. 13, 1932.  C. H. SAUVAN  1,876,764
INTERNAL COMBUSTION ENGINE
Filed Nov. 4, 1930  2 Sheets-Sheet 2
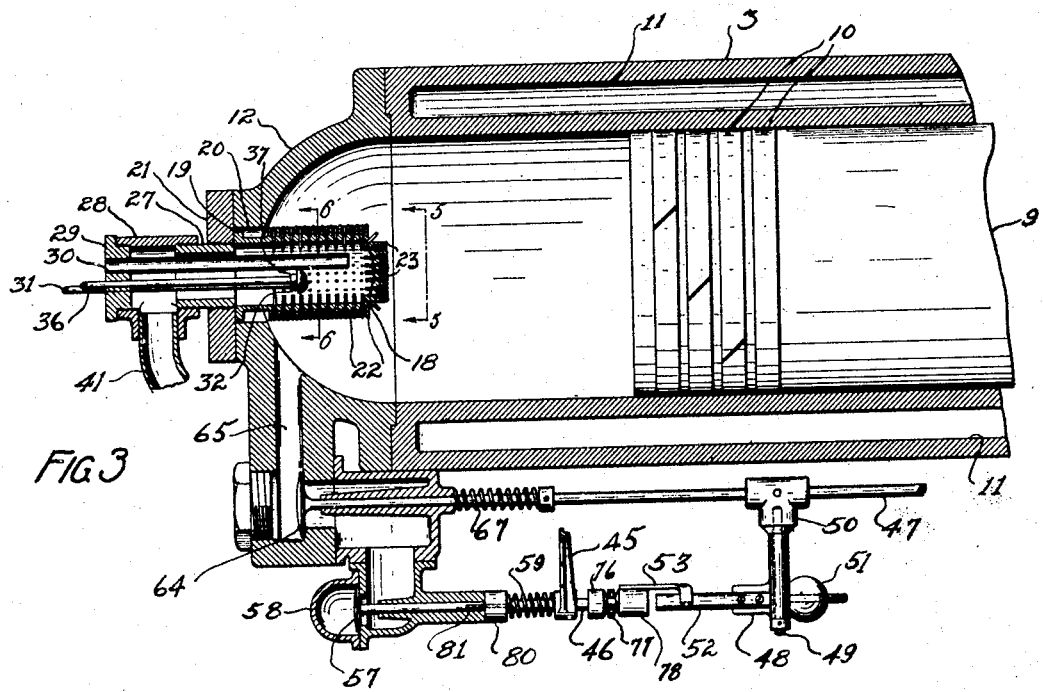
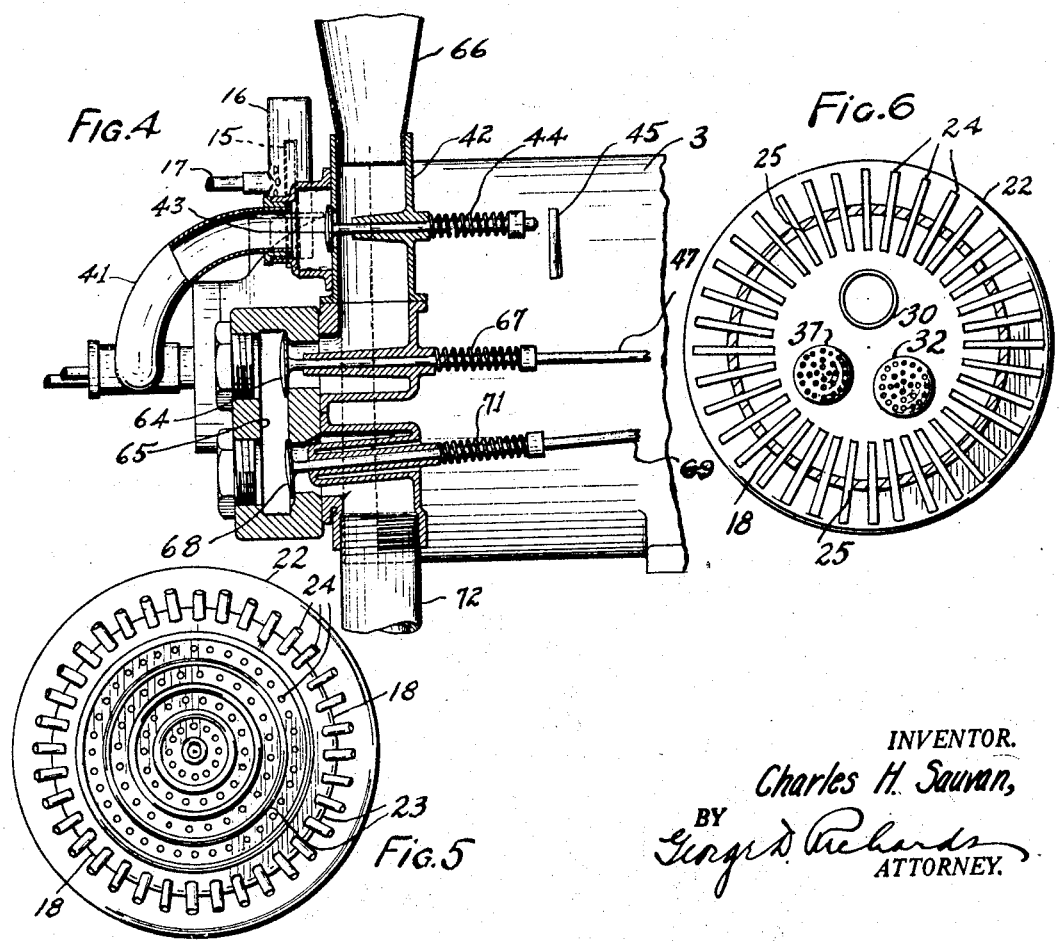
INVENTOR.
Charles H. Sauvan,
BY George D. Richards
ATTORNEY.

Patented Sept. 13, 1932

1,876,764

UNITED STATES PATENT OFFICE

CHARLES H. SAUVAN, OF NEWARK, NEW JERSEY

INTERNAL COMBUSTION ENGINE

Application filed November 4, 1930. Serial No. 493,334.

This invention relates, generally, to internal combustion engines; and the invention has reference, more particularly, to a novel internal combustion engine designed to burn fuel oil.

The internal combustion engine of the present invention is adapted to be used for general utility purposes, such as the driving of generators for generating electricity, the driving of machines, vehicles and ships, and in fact in all fields of use where power is consumed.

The principal object of the present invention is to provide a novel fuel oil burning internal combustion engine which is low in initial cost and which is highly economical to operate, the same being so constructed and and arranged as to provide for the thorough and complete vaporization of the fuel oil used regardless of the density thereof, said vaporized fuel being thoroughly intermixed with air to form a combustible mixture suited to the operating conditions of the engine, and then completely burned within the engine cylinder to produce a maximum of driving effort.

Another object of the present invention is to provide a novel fuel oil burning internal combustion engine which is easily started by the use of a suitable gaseous or vaporous fuel, such as illuminating gas or gasolene, and which in operation is designed to automatically and economically maintain any desired speed for which the engine is set, regardless of variations in the load carried by the machine.

Still another object of the present invention lies in the provision of an internal combustion engine of the above character having a novel fuel and water vaporizer which is highly efficient and reliable in operation, the said vaporizer serving, during the normal operation of the engine, to supply the necessary heat for igniting the fuel mixtures at the proper times after they are introduced into the engine cylinder, thereby eliminating the use of hot walls, heaters or other extraneous ignition means for firing the charges, during the normal engine operation, the said vaporizer enabling the engine to run with a relatively cool head and without danger of the same stalling, regardless of the action of a hit and miss governor used in checking the supply of fuel to the engine during periods of light load.

Other objects of this invention, not at this time particularly enumerated, will be clearly understood from the following detailed description of the same.

The invention is clearly illustrated in the accompanying drawings, in which:—

Fig. 1 is a view in elevation of the novel internal combustion engine of this invention.

Fig. 2 is a fragmentary view in end elevation of the cylinder and associated parts of the engine of Fig. 1.

Fig. 3 is an enlarged transverse, longitudinal, sectional view of a portion of the structure shown in Fig. 1.

Fig. 4 is an enlarged fragmentary view of a portion of the structure shown in Fig. 1 with parts broken away to better illustrate the invention.

Fig. 5 is an enlarged view of the inner end of the fuel and water vaporizer, this view being taken along line 5—5 of Fig. 3 looking in the direction of the arrows; and Fig. 6 is a sectional view taken along line 6—6 of Fig. 3 looking in the direction of the arrows.

Similar characters of reference are employed in all of the above described views to indicate corresponding parts.

Referring now to the said drawings, there is shown by way of illustration and for the sake of simplicity, a stationary single cylinder, horizontal internal combustion engine embodying the principles of the present invention. It is to be understood, however, that the invention is equally applicable to multi-cylinder engines or engines of the portable type, whether horizontal or vertical. The reference numeral 1 designates the internal combustion engine as a whole. Internal combustion engine 1 comprises a stationary base or bed 2 supporting a horizontally extending cylinder 3 and a fly wheel 4. Fly wheel 4 is keyed upon a crank shaft 5 which is rotatably mounted in bearing pedestals 6 fixed on the bed 2. A piston rod 7 is connected at one end to the crank 8 of crank shaft 5, and at its other end to a piston 9 (see Fig. 3) adapted to reciprocate within the cylinder 3. Piston 9 is provided with the usual piston rings 10 and the cylinder 3 is illustrated in Fig. 3 as having the usual water jacket or cooling water circulating space 11.

Cylinder 3 is provided with a cylinder head 12 which is illustrated as equipped with a typical form of ignition or firing tube 15 (see Fig. 4) extending through the wall of the head. Firing tube 15 is adapted to be heated by the customary "Bunsen" burner, which leads into a chimney 16 and is supplied with a heating fuel, such as illuminating gas, by means of pipe 17. The firing tube 15 is used to ignite the fuel mixtures within the engine only during the starting of the engine. Once the engine is hot the fuel supplied to the "Bunsen" burner through pipe 11 is shut off and thereafter the engine operates without using the firing tube 15, owing to the action of the novel vaporizer of this invention which thusly effects a considerable saving in the gaseous fuel used. It is to be understood that the use of the firing tube 15 is not essential, but that other means for igniting the combustible mixtures within the cylinder 3 during the starting operation of the engine, may be employed. Thus, for example, an electric spark such as that supplied by an electric ignition system may be employed as is well known to those skilled in the art.

According to the preferred arrangement, a novel fuel and water vaporizer 18 (see Fig. 3) is mounted within the cylinder head 12. Fuel and water vaporizer 18 is shown as of cylindrical shape having an open outer end and a closed inner end. The open outer end of the vaporizer is illustrated as provided with an external annular flange 19 for securing the vaporizer to the engine head. Flange 19 is fitted in sealed relation into a longitudinal aperture 20 provided in the head 12. An end flange 21 serves to retain the vaporizer in position within the cylinder head.

Vaporizer 18 projects for a considerable distance into the combustion or compression chamber provided with the interior of the cylinder head and is formed on its circumferential exterior surface with a plurality of spaced fins or annular ribs 22 (see Figs. 3, 5 and 6). The closed inner end of the vaporizer 18 is also provided on its exterior surface with a plurality of annular spaced fins or ribs 23. A plurality of annular rows of mutually spaced heat conducting rods 24 are disposed between the successive fins 22 and 23. Rods 24 are preferably made of a suitable heat conducting metal or alloy and project through and are sealed within receiving apertures or holes provided in the wall of the vaporizer 18. Rods 24 project for a distance into the interior of the vaporizer and serve to conduct heat from the combustion chamber surrounding the vaporizer to the interior of the vaporizer for vaporizing the fuel mixture therein in a manner to be further described.

The end flange 21 is formed with a central, longitudinally extending aperture that is axially aligned with the hollow interior of the vaporizer 18 and into which a nipple 27 is threaded, which nipple forms a portion of a T fitting 28 having a plug 29 in its outer end. An air bleeder tube 30 is fixed within an aperture in the plug 29 and this tube extends longitudinally into the interior of vaporizer 18. Tube 30 is adapted to convey a limited quantity of air into the interior of the vaporizer 18 during the normal operation of the engine 1. The air thus bled into the interior of the vaporizer enhances the vaporizing action of the vaporizer and enables the engine to run at indefinite periods at light loads without any tendency to stall.

Fuel oil piping 31 extends through an aperture in the plug 29 and projects into the interior of the vaporizer 18. Piping 31 has a nozzle 32 attached to its inner end within the vaporizer for spraying oil supplied through this piping into the interior of the vaporizer. The portion of piping 31 extending exteriorly of the engine cylinder, connects with an oil pump 33 having a pump rod 34. Pump 33 is adapted to pump oil from an oil supply (not shown) through inlet piping 35 and piping 31 to be sprayed into the interior of the vaporizer during the normal running of the engine 1. Water supply piping 36 extends through an aperture provided in the plug 29 and projects into the interior of the vaporizer 18, wherein the same is equipped with a nozzle 37 adapted to spray water into the interior of the vaporizer. The portion of piping 36 which extends exteriorly of the engine cylinder connects with a water pump 38 having a pump rod 39. Pump 38 is adapted to pump water from a water supply (not shown), through inlet piping 40 and piping 36 into the interior of the vaporizer during the normal running of the engine.

A fuel mixture supply pipe 41 connects the fitting 28 to the engine intake pipe 42. A poppet valve 43 controls the admission of fuel mixture from pipe 41 into intake pipe 42. Valve 43 is normally biased to closed position by a coil spring 44 surrounding the stem of this valve. Valve 43 is adapted to be actuated to open position by a wiper arm 45 which is mounted upon a longitudinally extending stem 46. Stem 46 is adapted to be actuated forwardly in the direction of its length by the inlet valve rod 47 through the intermediary of an inertia governor 48.

Inertia governor 48 is turnably mounted upon a pivotal pin 49 carried by a bracket 50 which is secured to the inlet valve rod 47. The ball 51 of governor 48, owing to its weight, normally tends to turn the governor about pin 49 so that the actuating finger 52 of the governor presses upwardly slightly against a guide bracket 53 carried by the stem 46. Guide bracket 53 normally serves to guide the tapered end of actuating finger 52, during a forward movement of the inlet valve rod, into a notch 54 provided in a cam 78 mounted on the rear end of stem 46. The forward movement of the inlet valve rod 47 thus during normal operation, effects a forward movement of stem 46 and wiper arm 45, to thereby effect an opening of the poppet valve 43. A bell-crank lever 74 is pivotally mounted on a bracket 75 fixed to the bed 2 and has one arm provided with a bifurcated end portion 77 which engages the stem 46 intermediate a collar 76 fixed thereon and the cam 78 on the rear end of this shaft. The other arm of bell-crank lever 74 is connected to the pump rods 34 and 39. Thus, the motion of stem 46, under the driving action of rod 47, effects the operation of pumps 33 and 38. In the event that the engine speed is higher than that fixed by the setting of the ball 51, this ball, during the forward stroke of the inlet valve rod, will serve to turn governor 48 so that the finger 52 does not engage in notch 54 but slides off a bevel portion 55 of the cam on the end of stem 46, thereby preventing forward movement of this stem so that valve 43 does not open to admit fuel mixture to the engine.

The stem 46 is guided in its longitudinal movement by a fixed collar 80 having an internal key which fits into a keyway 81 provided in stem 46. Stem 46 carries an engine starting valve 57 at its forward end. Valve 57 is adapted to control the supply of gaseous or other fuel to the engine during the starting operation thereof. Piping 58 is adapted to convey starting fuel to the valve 57 (see Figs. 2 and 3) for effecting the starting of the engine. A coil compression spring 59 on stem 46 serves to close valve 57 and to return stem 46 to its rearward position when actuating finger 52 moves rearwardly along with the intake valve rod 47.

Inlet valve rod 47 is operated in the usual manner by a cam 61 fixed on cam shaft 62 which is driven by gearing 63 off of the crank shaft 5. Inlet valve 64 has its stem secured to the forward end of valve 47. Valve 64 controls the admission of fuel mixture and air into passage 65 leading into the interior of the head 12. The bulk of air supplied to the engine enters by way of the throat 66 into the intake pipe 42 where it mixes with the fuel mixture supplied through pipe 41 and then passes by way of inlet valve 64 into the engine cylinder. A coil compression spring 67 surrounding inlet valve rod 47 serves to close valve 64 after cam 61 moves out of engagement with this valve rod.

The exhaust valve 68 is actuated to open position in the usual manner by an exhaust valve rod 69. Valve rod 69 is in turn actuated by a cam 70 on cam shaft 62. When valve 68 is open, exhaust gases leave the engine through exhaust pipe 72. A coil compression spring 71 on rod 69 serves to effect the closing of the exhaust valve after cam 70 disengages rod 69.

In operation, to start the engine 1, gaseous fuel such as illuminating gas or gasolene is used. The firing tube 15 is initially heated by means of gas supplied through pipe 17. Wiper arm 45 is turned angularly about stem 46 so that this arm does not contact with the stem of poppet valve 43 during the starting operation of the engine and hence no fuel mixture is supplied to the engine from the vaporizer 18 during this period. With the firing tube 15 hot, gaseous fuel is supplied to the engine starting valve 57 by way of piping 58. The fly wheel 4 is then turned over and the engine starts. During the starting operation, fuel from pipe 58 passes by way of starting valve 57 to intake pipe 42 where it mixes with air supplied through throat 66 and then passes by way of intake valve 64 and passage 65 into the engine cylinder where the combustible mixture is ignited at the proper time by the firing tube 15.

The vaporizer 18 being positioned within the interior of the head 12 and having the heat absorbing fins 22 and pins 24 thereon, rapidly absorbs heat from the hot products of combustion within the engine cylinder and soon becomes red hot. In the meanwhile, the pumps 33 and 38 are acting to spray fuel oil and water through nozzles 32 and 37 into the interior of the vaporizer 18. This fuel oil and water are soon vaporized within the hot interior of the vaporizer forming vaporous fuel and steam, respectively. The heat conducting rods 24 projecting into the interior of the vaporizer greatly faciltate the initial breaking up and final vaporization of the fuel and water particles within the vaporizer.

After the engine has been running for a few minutes and becomes hot the gaseous fuel supplied through pipe 58 is shut off and at the same time wiper arm 45 is turned so as to engage the stem of the poppet valve 43, whereupon a completely vaporized fuel mixture from the vaporizer 18 is thereafter drawn into the engine along with the requisite quantity of air. The gas supplied through piping 17 for heating the firing tube 15 may now be shut off, for the red hot vaporizer 18 will henceforth serve to ignite the combustible mixtures within the engine cylinder. The small quantity of air bled into the vaporizer through tube 29 serves to perfect the vaporization of fuel and water within the vaporizer and insures the continued operation of the engine even at extremely light loads when the governor 48 will shut off the supply of fuel to the engine one or more engine power strokes at a time. When it is desired to stop the engine it is merely necessary to shut off the supply of fuel and water to pumps 33 and 38.

It will thus be noted that the novel engine of this invention is adapted to handle all types of liquid fuel regardless of the density thereof, owing to the effective vaporizing action of the vaporizer 18. Since this engine is designed to handle heavy, relatively cheap fuels, it may be operated exceedingly economically. Also, since the vaporizer 18 remains at a relatively high temperature during the operation of the engine, the use of this vaporizer eliminates the necessity for employing the firing tube 15 during such normal operation of the engine, thereby effecting a substantial saving in the gaseous fuel used. The use of the air bleeder tube 30 serves to maintain the vaporizer at its high efficiency regardless of the action of the hit and miss governor in shutting off the supply of fuel to the engine for several power strokes at a time, so that the engine continues to operate substantially steadily regardless of the lightness of or variations in the load. The use of the hit and miss governor system, made possible and practicable by the vaporizer 18 even further enhances the economy of operation of the engine. It will be apparent that the vaporizer 18 may be made in various shapes other than cylindrical. This vaporizer may be round for example.

It will be noted that by providing the passage 65 in an extension of the head 12 and by having the intake valve 64 and the exhaust valve 68 operate within this extension, the pull or stress exerted by these valves is removed from the relatively light intake manifold housing 42. By having the exhaust valve rod 69 inclined it is possible to use but a single cam shaft, thereby greatly simplifying the engine construction.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In an internal combustion engine, in combination; a cylinder having a head thereon, an intake manifold in communication with the interior of said head for supplying combustible mixture to said cylinder, a vaporizer projecting into the interior of said head, said vaporizer comprising a hollow casing provided with a plurality of heat absorbing projections extending outwardly from the exterior surface thereof and a plurality of heat dissipating projections extending inwardly from the interior surface thereof, said exterior and interior projections cooperating to absorb heat from the hot products of combustion within said cylinder and conveying such heat to the interior of said vaporizer, fuel oil and water piping projecting into said vaporizer for spraying fuel oil and water respectively into the interior of said vaporizer to be evaporated therein, and conduit means connecting said vaporizer to said intake manifold, whereby vaporized fuel oil and steam are conveyed to said intake manifold for use in said engine.

2. In an internal combustion engine, in combination; a cylinder having a head thereon, an intake manifold in communication with the interior of said cylinder and adapted to supply combustible material thereto, a vaporizer projecting into the interior of said head, said vaporizer comprising a hollow casing provided with a plurality of heat absorbing fins on the exterior surface thereof, said casing having rod receiving apertures in the wall thereof, a plurality of rods extending through said apertures, portions of said rods extending exteriorly of said casing and other portions of said rods projecting into the hollow interior of said casing, said fins and said rods serving to conduct heat from the products of combustion within said cylinder to the interior of said vaporizer, fuel oil and water piping projecting into said vaporizer for spraying fuel oil and water, respectively, into the interior thereof to be evaporated therein, and conduit means connecting said vaporizer to said intake manifold, whereby vaporized fuel oil and steam are conveyed to said intake manifold for use in said engine.

3. In an internal combustion engine, in combination; a cylinder having a head thereon, an intake manifold in communication with the interior of said cylinder and adapted to supply combustible material thereto, a vaporizer projecting into the interior of said head, said vaporizer comprising a hollow casing provided with a plurality of heat absorbing fins on the exterior of the surface thereof, said casing having rod receiving apertures in the wall thereof, a plurality of rods extending through said apertures, portions of said rods extending exteriorly of said casing, and other portions of said rods projecting into the hollow interior of said casing, said fins and said rods serving to conduct heat from the products of combustion within said cylinder to the interior of said vaporizer, an air bleeder tube projecting into said vaporizer and adapted to conduct a relatively small quantity of air thereinto during the normal operation of said engine, fuel oil and water piping projecting into said vaporizer for spraying fuel oil and water, respectively, into the interior thereof to be evaporated therein, and conduit means connecting said vaporizer to said intake manifold, whereby vaporized fuel oil and steam are conveyed to said intake manifold for use in said engine.

4. In an internal combustion engine, in combination, an engine cylider, a head for said cylinder, said head having an aperture therein, a vaporizer having a hollow cylindrical casing positioned within the interior of said head, said vaporizer having an open outer end sealed within the aperture of said head and a closed inner end, spaced annular fins formed upon and projecting outwardly from the exterior surface of said casing within said head, said casing being provided with apertures intermediate said fins, heat conducting rods sealed within said apertures, said rods having portions thereof projecting exteriorly of said casing and other portions thereof projecting interiorly thereof, a hollow fitting secured to said head exteriorly thereof and in communication with the interior of said casing, fuel oil and water supply piping projecting through said fitting and into the interior of said casing, spray nozzles provided on the inner ends of said piping for spraying fuel oil and water into the interior of said vaporizer to be evaporated therein, a tube carried by said fitting and projecting into the interior of said casing, said tube serving to supply a limited quantity of air into the interior of said casing, and conduit means connecting said fitting to the interior of said engine cylinder, whereby fuel and water vaporized in said vaporizer is utilized in said cylinder.

5. In an internal combustion engine, in combination; an engine cylinder, a head for said cylinder having an extension with a passage therein, an intake manifold in communication with the interior of said head extension passage for supplying a combustible mixture to said cylinder, said intake manifold having an air inlet opening, a vaporizer carried by said head and projecting into the interior thereof, piping connected with said vaporizer for spraying fuel oil and water thereinto to be evaporated therein, an air bleeder member extending within said vaporizer and communicating with the exterior of said head for conveying a limited quantity of air moving under engine suction into said vaporizer, conduct means connecting said vaporizer to said intake manifold for conducting a vaporized fuel and steam mixture to said intake manifold from said vaporizer, valve means positioned at the juncture of said conduit means with said intake manifold for controlling the admission of said mixture into said intake manfold, and an intake valve interposed between said intake manifold and said engine cylinder and operating within the passage of said head extension for controlling the flow of combustible mixture into said cylinder.

6. In an internal combustion engine, in combination; an engine cylinder, a head for said cylinder, an intake manifold in communication with the interior of said head for supplying a combustible mixture to said cylinder, said intake manifold having an air inlet opening, a vaporizer carried by said head and projecting into the interior thereof, piping connected with said vaporizer for spraying fuel oil and water thereinto to be evaporated therein, bleeder means for supplying a limited quantity of air at substantially atmospheric pressure to the interior of said vaporizer, conduit means connecting said vaporizer to said intake manifold for conducting a vaporized fuel and steam mixture to said intake manifold from said vaporizer, valve means positioned at the juncture of said conduit means with said intake manifold for controlling the admission of said mixture into said intake manifold, and an intake valve interposed between said intake manifold and said engine cylinder for controlling the flow of combustible mixture into said cylinder, said valve means and said intake valve being adapted to be simultaneously operated during the normal operation of said engine.

7. In an internal combustion engine, in combination; an engine cylinder, a head for said cylinder, an intake manifold in communication with the interior of said head for supplying a combustible mixture to said cylinder, said intake manifold having an air inlet opening, a vaporizer carried by said head and projecting into the interior thereof, piping connected with said vaporizer for spraying fuel oil and water thereinto to be evaporated therein, means for supplying a limited quantity of air to the interior of said vaporizer, conduit means connecting said vaporizer to said intake manifold for conducting a vaporized fuel and steam mixture to said intake manifold from said vaporizer, valve means positioned at the juncture of said conduit means with said intake manifold for controlling the admission of said mixture into said intake manifold, an intake valve interposed between said intake manifold and said engine cylinder for controlling the flow of combustible mixture into said cylinder, said valve means and said intake valve being adapted to be simultaneously operated during the normal operation of said engine, and governor means arranged to cause said valve means to remain closed and to cut off the supply of fuel oil and water to said vaporizer during periods of engine overspeed.

8. In an internal combustion engine, in combination; an engine cylinder, a head for said cylinder having an extension with a passage therein leading into said cylinder, an intake manifold in communication with the interior of said head for supplying a combustible mixture to said cylinder, said intake manifold having an air inlet opening, a starting fuel supply pipe connected to said intake manifold, a starting valve operable in connection with said starting fuel supply pipe for controlling the supply of starting fuel to said engine, a vaporizer carried by said head and projecting into the interior thereof, piping connected with said vaporizer for spraying fuel oil and water thereinto to be evaporated therein, means for supplying a limited quantity of air to the interior of said vaporizer, conduit means connecting said vaporizer to said intake manifold for conducting a vaporized fuel and steam mixture to said intake manifold from said vaporizer, valve means positioned at the juncture of said conduit means with said intake manifold for controlling the admission of said mixture into said intake manifold, an intake valve positioned within said passage in said head extension and interposed between said intake manifold and said engine cylinder for controlling the flow of combustible mixture into said cylinder, said valve means and said intake valve being adapted to be simultaneously operated during the normal operation of said engine, and an exhaust valve positioned within said passage in said head extension.

In testimony that I claim the invention set forth above I have hereunto set my hand this 29th day of October, 1930.

CHARLES H. SAUVAN.